(No Model.)
C. FISHER.
ANVIL.
No. 365,678. Patented June 28, 1887.
Fig. I.
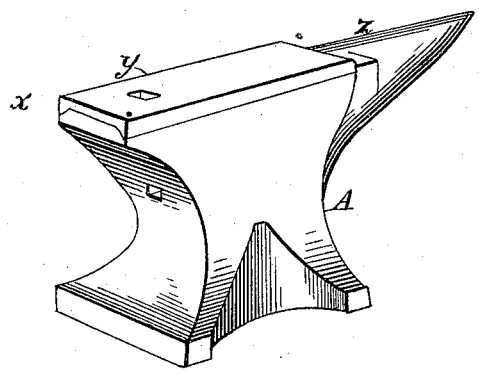
Fig. 2.
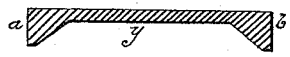
WITNESSES:
Francis P. Reilly
A. H. McGinley
INVENTOR
Clark Fisher
BY
P. R. Voorhees
ATTORNEY

UNITED STATES PATENT OFFICE.

CLARK FISHER, OF TRENTON, NEW JERSEY.

ANVIL.

SPECIFICATION forming part of Letters Patent No. 365,678, dated June 28, 1887.

Application filed March 24, 1887. Serial No. 232,347. (No model.)

*To all whom it may concern:*

Be it known that I, CLARK FISHER, of Trenton, in the county of Mercer and State of New Jersey, have invented a new and useful Improvement in Anvils, which invention or improvement is fully set forth and illustrated in the following specification and accompanying drawings.

The object of this invention is to facilitate the welding of steel faces to cast-iron anvils, to facilitate also the hardening and tempering of said faces after welding, to make a stronger and more durable anvil, and to cheapen the product as a whole or complete article of manufacture.

The complete invention consists of a cast-iron anvil having welded thereto a steel face, of the form hereinafter fully described, and set forth in the claims.

In the accompanying drawings, Figure 1 shows the anvil, in perspective, complete. Fig. 2 shows a geometrical cross section of the steel face of the anvil detached and upon an enlarged scale.

In said figures the several parts are indicated by reference-letters marked thereon, and used in explanation and description, as follows:

All blacksmiths' anvils are constructed of either a cast-iron or wrought-iron body, upon which is welded the face or working-surface of steel. The process of welding steel to cast-iron is necessarily different from that of welding steel to wrought-iron; but heretofore the steel faces have always been made of uniform thickness for welding to the bodies of all blacksmiths' anvils.

From the brittle nature of cast-iron, additional strength must be derived from the steel overlying it and welded to it, both in the projecting and overhanging portion, called the "tail," $x$, of the anvil, and also along both edges, where the severe work is likely to come and liable to cause crumbling or breaking out, more than in the central longitudinal portion of the face; but excessive thickness of steel face over the whole surface of the cast-iron renders the process of welding to the cast-iron both difficult and uncertain; and, likewise, in the subsequent process of reheating and sudden cooling, to give the steel surface the required hardness and temper, there is danger of failure, on account of the difference of expansion and contraction of the two united metals from these sudden changes of temperature when the steel is in one large and uniformly-thick mass. Commercially considered, also, where there is the same thickness of the expensive steel on the central portions of the anvil as on its edges, there occurs in manufacture a waste of material. My invention therefore obviates all these objections by reenforcing or thickening the edges of the steel plates forming the faces of the anvils along said edges lengthwise by welding to the body of the anvil A the plates $y$, of the general shape or form clearly shown in cross-section in Fig. 2, said plates being channeled, so as to be deeper or thicker along their under sides, $a\ b$, than at the other portions. The horn of the anvil is indicated by the letter Z. The interior sides of the flanges of the plates $y$ are preferably beveled, as shown in cross-section, to facilitate the flow of the cast metal in the process of welding.

Having thus fully described my said improvement as of my invention, I claim—

1. A steel face-plate for a blacksmith's anvil having a horizontal transverse section of greater thickness at and about its edges than in its central or remaining portions, said increased thickness being on the lower or welding surface, substantially as and for the purposes set forth.

2. As a new article of manufacture, a blacksmith's anvil having a steel face, as $y$, welded thereon, and so proportioned as to give the anvil greater thickness and strength of steel along its edges than in its central and remaining working-surface of face, substantially as and for the purposes set forth.

CLARK FISHER.

Witnesses:
CHAS. W. EDWARDS,
EDWARD C. STOVER.